US009879608B2

(12) United States Patent
Sheridan

(10) Patent No.: US 9,879,608 B2
(45) Date of Patent: Jan. 30, 2018

(54) OIL LOSS PROTECTION FOR A FAN DRIVE GEAR SYSTEM

(71) Applicant: United Technologies Corporation, Hartford, CT (US)

(72) Inventor: William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 314 days.

(21) Appl. No.: 14/635,524

(22) Filed: Mar. 2, 2015

(65) Prior Publication Data

US 2016/0010563 A1    Jan. 14, 2016

Related U.S. Application Data

(60) Provisional application No. 61/954,039, filed on Mar. 17, 2014.

(51) Int. Cl.
*F02C 7/36* (2006.01)
*F02C 7/06* (2006.01)
(Continued)

(52) U.S. Cl.
CPC ............... *F02C 7/36* (2013.01); *F01D 25/18* (2013.01); *F02C 3/04* (2013.01); *F02C 7/06* (2013.01);
(Continued)

(58) Field of Classification Search
CPC .... F02C 7/06; F02C 7/36; F01D 25/18; F16H 57/04; F16H 57/08; F16H 5/0247;
(Continued)

(56) References Cited

U.S. PATENT DOCUMENTS

| 2,258,792 A | 4/1941 | New |
| 2,652,296 A | 9/1953 | Palmgren et al. |

(Continued)

FOREIGN PATENT DOCUMENTS

| DE | 102010032252 | 1/2012 |
| EP | 0791383 | 8/1997 |

(Continued)

OTHER PUBLICATIONS

NASA Conference Publication. Quiet, powered-lift propulsion. Cleveland, Ohio. Nov. 14-15, 1978.

(Continued)

*Primary Examiner* — Pascal M Bui Pho
*Assistant Examiner* — Eric Linderman
(74) *Attorney, Agent, or Firm* — Carlson, Gaskey & Olds, P.C.

(57) ABSTRACT

A fan drive gear system includes at least one intermediate gear that includes an axial gear passage for receiving and conveying a fluid suitable for cooling and/or lubricating. At least a first axial end of the intermediate gear includes a first fluid storage trap for capturing fluid entering and/or exiting the gear passage and storing the fluid therein during powered operation of the fan drive gear system. The fluid is capable of being passively supplied to the intermediate gear passage during an interrupted power event.

23 Claims, 3 Drawing Sheets

(51) Int. Cl.

| | | |
|---|---|---|
| F01D 25/18 | (2006.01) | |
| F16H 57/04 | (2010.01) | |
| F16H 57/08 | (2006.01) | |
| F02C 3/04 | (2006.01) | |
| F02C 7/16 | (2006.01) | |
| F16H 1/36 | (2006.01) | |

(52) U.S. Cl.
CPC .............. *F02C 7/16* (2013.01); *F16H 1/36* (2013.01); *F16H 57/043* (2013.01); *F16H 57/0427* (2013.01); *F16H 57/0442* (2013.01); *F16H 57/0456* (2013.01); *F16H 57/0479* (2013.01); *F16H 57/0486* (2013.01); *F16H 57/082* (2013.01); *F05D 2220/32* (2013.01); *F05D 2240/35* (2013.01); *F05D 2260/20* (2013.01); *F05D 2260/40311* (2013.01); *F05D 2260/53* (2013.01); *F05D 2260/98* (2013.01)

(58) Field of Classification Search
CPC .... F16H 5/0423; F16H 5/0442; F16H 5/0456; F16H 5/0479; F16H 5/0486; F16H 5/04827
See application file for complete search history.

(56) References Cited

U.S. PATENT DOCUMENTS

| | | | |
|---|---|---|---|
| 2,936,655 A * | 5/1960 | Peterson | F16H 1/2809 |
| | | | 475/347 |
| 3,021,731 A * | 2/1962 | Stoeckicht | F16H 1/2809 |
| | | | 475/344 |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,747,343 A | 7/1973 | Rosen | |
| 3,754,484 A | 8/1973 | Roberts | |
| 3,820,719 A | 6/1974 | Clark | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,086,759 A * | 5/1978 | Karstensen | F01D 25/18 |
| | | | 184/6.11 |
| 4,130,872 A | 12/1978 | Harloff | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,979,362 A | 12/1990 | Vershure, Jr. | |
| 5,102,379 A * | 4/1992 | Pagluica | F16H 1/2836 |
| | | | 475/159 |
| 5,141,400 A | 8/1992 | Murphy et al. | |
| 5,317,877 A | 6/1994 | Stuart | |
| 5,433,674 A | 7/1995 | Sheridan et al. | |
| 5,447,411 A | 9/1995 | Curley et al. | |
| 5,466,198 A * | 11/1995 | McKibbin | F02C 6/206 |
| | | | 475/346 |
| 5,524,847 A | 6/1996 | Brodell et al. | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,223,616 B1 * | 5/2001 | Sheridan | F16H 1/2827 |
| | | | 184/6.12 |
| 6,315,815 B1 | 11/2001 | Spadaccini et al. | |
| 6,318,070 B1 | 11/2001 | Rey et al. | |
| 6,387,458 B1 | 5/2002 | Eaton, Jr. et al. | |
| 6,517,341 B1 | 2/2003 | Brun et al. | |
| 6,602,158 B2 * | 8/2003 | Wildeshaus | F16H 57/0427 |
| | | | 475/159 |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 7,021,042 B2 | 4/2006 | Law | |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,806,651 B2 | 10/2010 | Kennepohl et al. | |
| 7,824,305 B2 | 11/2010 | Duong et al. | |
| 7,926,260 B2 | 4/2011 | Sheridan et al. | |
| 7,997,868 B1 | 8/2011 | Liang et al. | |
| 8,167,554 B2 * | 5/2012 | Wang | F03D 1/0608 |
| | | | 244/204.1 |
| 8,205,432 B2 | 6/2012 | Sheridan | |
| 8,246,503 B2 * | 8/2012 | Sheridan | F02C 7/06 |
| | | | 184/6.12 |
| 8,845,277 B2 * | 9/2014 | Davis | F01D 25/16 |
| | | | 415/142 |
| 8,870,124 B2 * | 10/2014 | Ireland | B64C 23/06 |
| | | | 244/130 |
| 9,359,957 B2 * | 6/2016 | Makulec | |
| 2005/0043136 A1 * | 2/2005 | Colter | F16H 57/08 |
| | | | 475/344 |
| 2006/0223664 A1 * | 10/2006 | Duong | F16H 57/042 |
| | | | 475/159 |
| 2006/0252596 A1 | 11/2006 | Abarquez et al. | |
| 2008/0003096 A1 | 1/2008 | Kohli et al. | |
| 2008/0317588 A1 | 12/2008 | Grabowski et al. | |
| 2009/0056343 A1 | 3/2009 | Suciu et al. | |
| 2009/0247348 A1 * | 10/2009 | Haupt | F16H 57/0427 |
| | | | 475/159 |
| 2010/0148396 A1 | 6/2010 | Xie et al. | |
| 2010/0218483 A1 | 9/2010 | Smith | |
| 2010/0317477 A1 * | 12/2010 | Sheridan | F02C 7/06 |
| | | | 475/159 |
| 2010/0317478 A1 * | 12/2010 | McCune | F01D 25/166 |
| | | | 475/159 |
| 2010/0331139 A1 * | 12/2010 | McCune | F02C 7/06 |
| | | | 475/331 |
| 2011/0008174 A1 * | 1/2011 | Ireland | B64C 23/06 |
| | | | 416/223 R |
| 2011/0159797 A1 | 6/2011 | Beltman et al. | |
| 2011/0203284 A1 * | 8/2011 | Ritland | F23R 3/286 |
| | | | 60/739 |
| 2011/0223033 A1 * | 9/2011 | Wang | F03D 1/0608 |
| | | | 416/235 |
| 2011/0286836 A1 * | 11/2011 | Davis | F01D 25/16 |
| | | | 415/170.1 |
| 2011/0293423 A1 | 12/2011 | Bunker et al. | |
| 2012/0124964 A1 | 5/2012 | Hasel et al. | |
| 2013/0000323 A1 * | 1/2013 | Kupratis | F02C 7/36 |
| | | | 60/801 |
| 2013/0048091 A1 * | 2/2013 | DiBenedetto | F01D 25/20 |
| | | | 137/2 |
| 2013/0051975 A1 * | 2/2013 | Makulec | F01D 25/18 |
| | | | 415/1 |
| 2013/0091863 A1 * | 4/2013 | Makulec | F02C 7/277 |
| | | | 60/788 |
| 2013/0269479 A1 | 10/2013 | can der Merwe et al. | |
| 2016/0377165 A1 * | 12/2016 | Sheridan | F16H 57/0486 |
| | | | 60/226.1 |

FOREIGN PATENT DOCUMENTS

| | | |
|---|---|---|
| EP | 1142850 | 10/2001 |
| EP | 1703174 | 9/2006 |
| FR | 2995055 | 3/2014 |
| GB | 1516041 | 6/1978 |
| GB | 2041090 | 9/1980 |
| GB | 2426792 | 12/2006 |
| WO | 2007038674 | 4/2007 |
| WO | 2013155260 | 10/2013 |

OTHER PUBLICATIONS

"Civil Turbojet/Turbofan Specifications", Jet Engine Specification Database (Apr. 3, 2005).

(56) References Cited

OTHER PUBLICATIONS

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Hague, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

Extended European Search Report for Application No. 15158519.7 dated Sep. 15, 2015.

Baker, R.W. (2000). Membrane technology and applications. New York, NY: McGraw-Hill. pp. 87-151.

Cheryan, M. (1998). Ultrafiltration and microfiltration handbook. Lancaster, PA: Tecnomic Publishing Company, Inc. pp. 171-236.

(56) References Cited

OTHER PUBLICATIONS

Beader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubircant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https:f/www.cgabusinessdesk.com/document/aviation_tech_review.pdf.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_pffe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of 1-91. Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29, pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.

(56) References Cited

OTHER PUBLICATIONS

Wilfert, G. Architectures, (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Attia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003.. p. 1-6 and Appendices.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal barrier coatings. Annual. Rev. Mater. Res. vol. 33. 2003. pp. 383-417.

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28(9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Detrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

\* cited by examiner

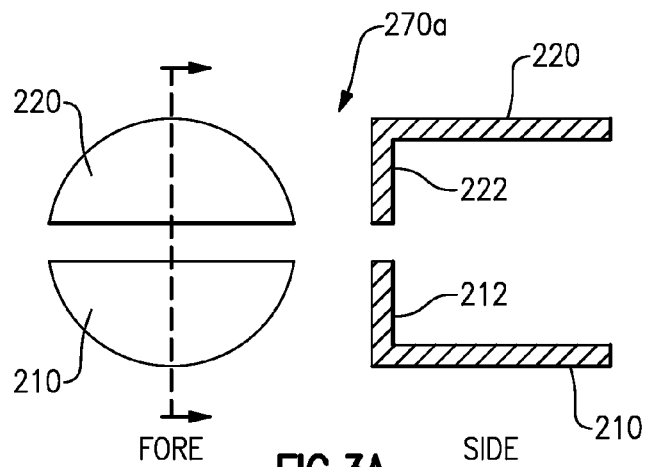

OIL LOSS PROTECTION FOR A FAN DRIVE
GEAR SYSTEM

CROSS-REFERENCE TO RELATED
APPLICATION

This application claims priority to U.S. Provisional Application No. 61/954,039 filed on Mar. 17, 2014.

TECHNICAL FIELD

The present disclosure relates generally to fan drive gear systems, and more specifically to an oil loss prevention apparatus for the same.

BACKGROUND

Gas turbine engines, such as those utilized in commercial aircraft, frequently utilize a geared turbofan engine. In a typical geared turbofan engine, a forward fan is connected to a central shaft via a gearing system. The gearing system allows multiple components of the turbine engine to be rotated at different speeds off of the same shaft.

One type of commonly used gear system is referred to as an epicyclic gear system. An epicyclic gear system has one or more outer gears (intermediate gears), revolving about a central gear (sun gear). Typically, the intermediate gears are mounted on a carrier which itself may rotate relative to the sun gear. Epicyclic gear systems also typically incorporate the use of an outer ring gear, which meshes with the intermediate gears.

In one example, the carrier is fixed from rotation about the sun gear and this is referred to as a Star system. The intermediate gears are referred to as star gears and rotate about a fixed axis in the carrier and cause the ring gear to rotate in the opposite direction as the sun gear.

In another example, the ring gear is fixed and the carrier and intermediate gears are allowed to rotate about the sun gear. This type of gear system is referred to as a Planetary system. The intermediate gears are referred to as planet gears. In this example the carrier rotates in the same direction as the sun gear.

During operation of the planetary gear system a lubricant/coolant fluid, such as oil is provided to the internal components of the planetary gear system. The lubricant/cooling fluid cools the components and prevents wear/seizing of the gear system.

SUMMARY OF THE INVENTION

A fan drive gear system according to an exemplary embodiment of this disclosure, among other possible things includes at least one intermediate gear that includes an axial gear passage for receiving and conveying a fluid suitable for cooling and/or lubricating, and at least a first axial end of the planetary gear includes a first fluid storage trap for capturing fluid entering and/or exiting the gear passage and storing the fluid therein during powered operation of the fan drive gear system, whereby the fluid is capable of being passively supplied to the planet gear passage during an interrupted power event.

In a further embodiment of the foregoing fan drive gear system, a sun gear interfaced with the intermediate gear, a ring gear interfaced with the intermediate gear, and a carrier body supporting the intermediate gear.

A further embodiment of the foregoing fan drive gear system includes, the at least one fluid trap includes a radially outward base portion relative to an axis defined by the carrier body and at least one radially inward base portion relative to the axis defined by the carrier body.

In a further embodiment of the foregoing fan drive gear system, the radially outward base portion is defined on a first axial end by a radially aligned wall segment of the carrier body relative to the axis defined by the carrier body and the radially outward base portion is defined on a second axial end by a radially aligned wall of the trap.

In a further embodiment of the foregoing fan drive gear system, the radially aligned wall of the fluid storage trap extends further radially away from the axis defined by the carrier body than the radially aligned wall segment.

In a further embodiment of the foregoing fan drive gear system, the at least one intermediate gear includes an axially aligned through hole having an opening at a first end and an opening at a second end opposite the first end, and the radially aligned wall segment of the carrier body extends to an edge of the opening such that excess fluid in the trap spills from the fluid storage trap into the intermediate gear.

In a further embodiment of the foregoing fan drive gear system, the at least one fluid storage trap includes a first fluid storage trap disposed on a first axial end of the intermediate gear and a second fluid storage trap disposed at a second end of the intermediate gear.

In a further embodiment of the foregoing fan drive gear system, the at least one fluid storage trap is a passive element.

In a further embodiment of the foregoing fan drive gear system, the at least one fluid storage trap is affixed to the carrier body via at least one of a seal element and a bond such that a lubricant does not leak between the fluid storage trap and the carrier body.

In a further embodiment of the foregoing fan drive gear system, the fluid storage trap is affixed to the carrier body via at least a bond, and the bond is at least one of a welded bond and an adhesive bond.

In a further embodiment of the foregoing fan drive gear system, the intermediate gear includes an axially aligned bore receiving a pin, at least one roller bearing disposed between a radially outer surface of the pin and a radially outer surface of the intermediate gear, the pin includes an axially aligned bore defining a radially inner pin surface, and the pin includes at least one through hole connecting the radially inner pin surface to a radially outer pin surface such that a fluid in the through hole is passed to an interior of the carrier body.

A further embodiment of the foregoing fan drive gear system includes a powered fluid injection system disposed adjacent at least one opening of the axially aligned bore such that fluid is injected into an interior of said pin.

A gas turbine engine according to an exemplary embodiment of this disclosure, among other possible things includes a fan, a compressor module downstream of the fan, a combustor downstream of the compressor, a turbine module downstream of the combustor having at least a fan drive turbine that indirectly drives the fan, a fan drive gear system mechanically connecting the fan drive turbine and the fan, and the fan drive gear system includes at least one intermediate gear that includes an axial gear passage for receiving and conveying a fluid suitable for cooling and/or lubricating, and at least a first axial end of the planetary gear includes a first fluid storage trap for capturing fluid entering and/or exiting the gear passage and storing the fluid therein during powered operation of the fan drive gear system, whereby the fluid is capable of being passively supplied to the planet gear passage during an interrupted power event.

In a further embodiment of the foregoing gas turbine engine, the fan drive gear system includes a sun gear interfaced with the intermediate gear, a ring gear interfaced with the intermediate gear, and a carrier body supporting the intermediate gear.

In a further embodiment of the foregoing gas turbine engine, the at least one fluid storage trap is operable to retain a fluid injected into the at least one intermediate gear, and return the fluid to the at least one planetary gear.

In a further embodiment of the foregoing gas turbine engine, the at least one fluid trap includes a first fluid trap disposed on a first axial end of the planetary gear and a second fluid trap disposed at a second end of the planetary gear.

In a further embodiment of the foregoing gas turbine engine, the at least one fluid storage trap is a passive element.

In a further embodiment of the foregoing gas turbine engine, the at least one fluid storage trap is affixed to the carrier body via at least one of a seal element and a bond such that a lubricant does not leak between the fluid storage trap and the carrier body.

In a further embodiment of the foregoing gas turbine engine, the fluid storage trap is affixed to the carrier body via at least a bond, and the bond is at least one of a welded bond and an adhesive bond.

A method for providing fluid to a fan drive gear system during interrupted power according to an exemplary embodiment of this disclosure, among other possible things includes disposing a fluid storage trap adjacent an opening in an intermediate gear, receiving and retaining excess fluid in the fluid storage trap during powered operation of the fan drive gear system, and passively returning the excess fluid to the fluid storage trap during unpowered operation of the fan drive gear system.

The foregoing features and elements may be combined in any combination without exclusivity, unless expressly indicated otherwise.

These and other features of the present invention can be best understood from the following specification and drawings, the following of which is a brief description.

BRIEF DESCRIPTION OF THE DRAWINGS

FIG. 3A illustrates a first example fluid trap.

FIG. 3B illustrates a second example fluid trap.

FIG. 3C schematically illustrates a third example fluid trap.

DETAILED DESCRIPTION OF AN EMBODIMENT

Figure 1:
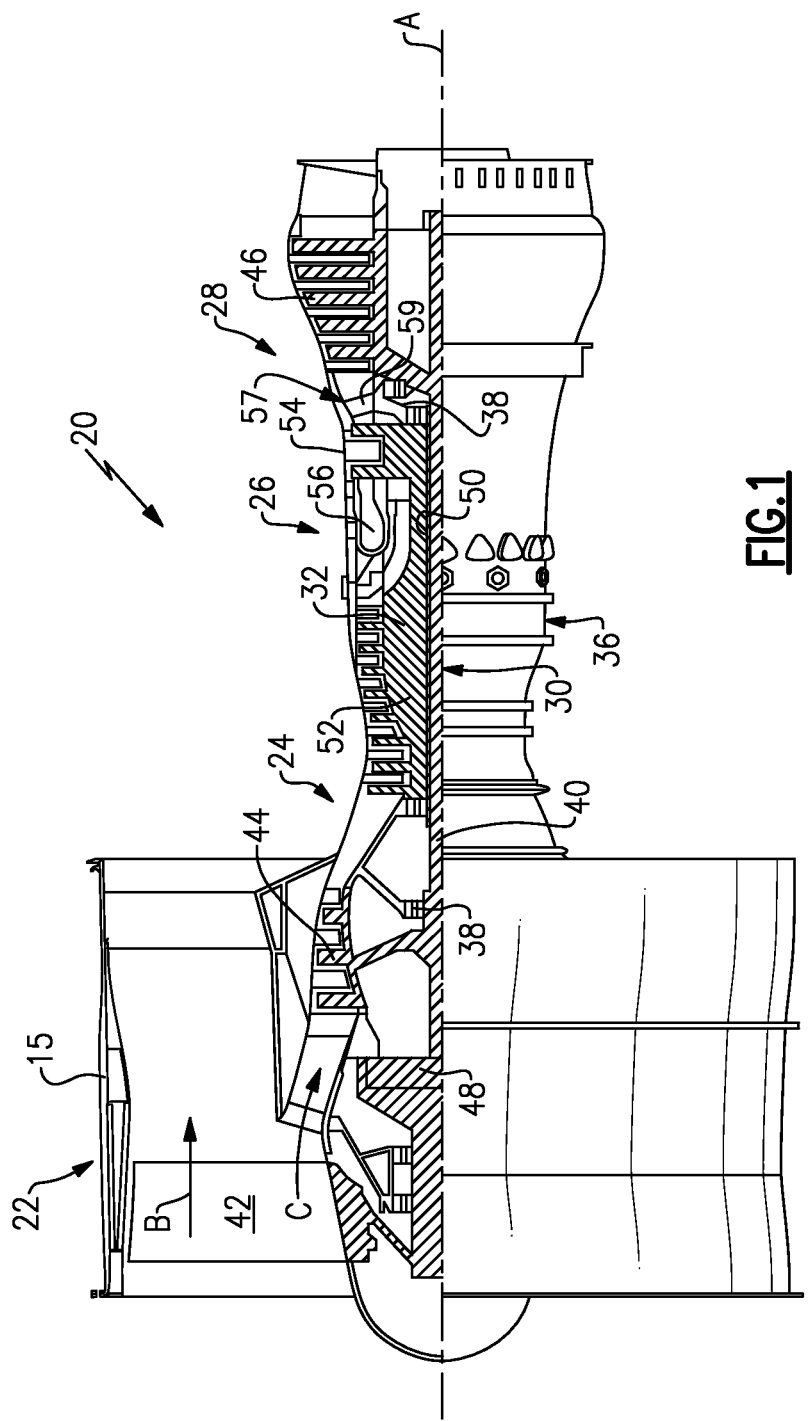
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a gear system 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the gear system 48 is an epicyclic gear train, such as a planetary gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are exemplary of one embodiment, and the present invention is applicable to gas turbine engines having other parameters as well.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7 °R)]0.5. The "Low corrected fan tip speed" as disclosed herein according to one non-limiting embodiment is less than about 1150 ft/second.

Figure 2:
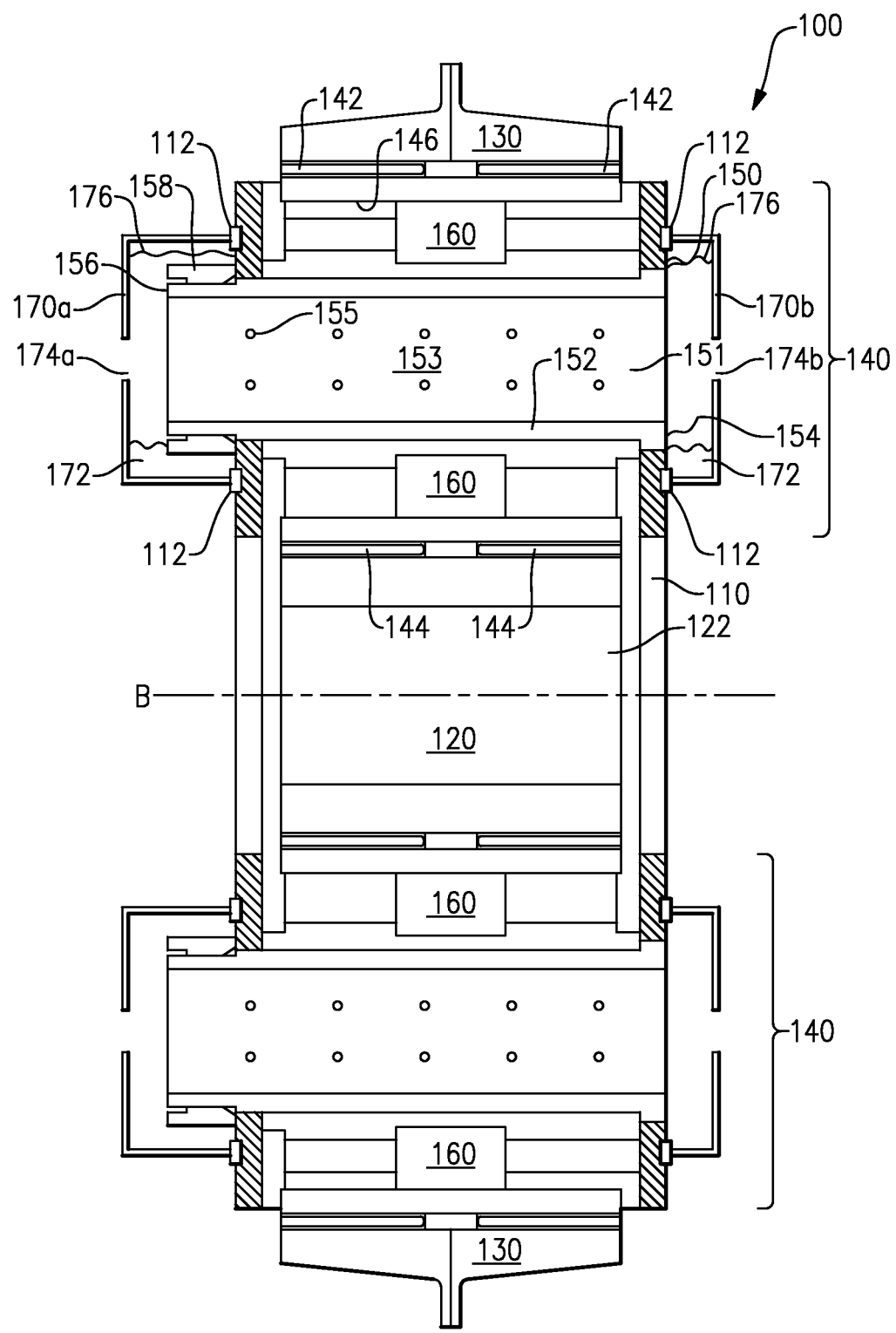
FIG. 2 schematically illustrates a cross sectional view of an epicyclic gearbox.

FIG. 2 schematically illustrates a cross sectional view of an epicyclic gearbox 100, such as could be used for the gear system 48 of FIG. 1. The gearbox 100 includes a carrier 110 that defines a central axis B. A sun gear 120 is centrally disposed in the carrier 110. The sun gear 120 includes a central opening 122 for receiving and interconnecting with an input shaft (not pictured), such as the shaft 40 of FIG. 1. A ring gear 130 is positioned on a radially outward edge of the gearbox 100.

The ring gear 130 is connected to the sun gear 120 via planetary gears 140 at a gear mesh 142 (for the connection to the ring gear 130) and a gear mesh 144 (for the connection to the sun gear 120). The illustrated example of FIG. 2 illustrates two planetary gears 140. In alternate examples, any number of planetary gears 140 can be used depending on the specific needs and requirements of a given gear system, with each of the planetary gears 140 being constructed similarly to the planetary gears 140 described herein.

Each planetary gear 140 includes an axially aligned bore hole 150 through which a pin 152 protrudes. The pin 152 is connected to the carrier 110 on a first axial end 154 and protrudes axially beyond the carrier 110 on a second axial end 156. In the illustrated example, a retaining device 158, such as a threaded fastener, is disposed about the pin 152 at or near the second axial end 156. The retaining device 158 maintains the pin 152 in position within the planetary gear 140. The pin 152 includes an axially aligned through-hole 151 defining an internal axially aligned surface 153 of the pin 152. Disposed across the body of the pin 152 are multiple lubricant/coolant holes 155 that provide a passageway from the through-hole 151 to the interior of the planetary gear 140.

At least one bearing element 160 is disposed between the pin 152 and an inner surface 146 of the planetary gear 140. In the illustrated example of FIG. 2, the bearing element 160 is a roller bearing. In alternate examples the bearing element 160 can be any other suitable bearing type. Disposed on each axial end 154, 156 of the pin 152 is a fluid trap 170.

During operation of the gearbox 100 a lubricant/coolant, such as oil or another fluid, is injected into the pin 152 using a powered lubricant/coolant injector. The lubricant/coolant leaks out of the pin 152 through the lubricant/coolant holes 155 disposed on the internal axially aligned surface 153 of the pin 152. As the lubricant/coolant leaks out through the pin 152, the lubricant/coolant is thrown, or sprayed, throughout the gearbox 100 and each of the sun gear 120, the ring gear 130, and the planetary gears 140 are lubricated and cooled. The lubricant/coolant provides one or both of the lubricating and cooling functions, depending on design parameters.

The lubricant/coolant is injected into the pin 152 using a powered injector (not shown) of any known type. During periods of interrupted power, or periods where no power is provided to the powered injector, no lubricant/coolant is injected into the pin 152 and no lubricant is provided to the gearbox 100. If the power interruption is too long (exceeds a certain duration), the gearbox 100 can overheat and/or seize causing significant damage to the gearbox 100 and potentially to one or more systems connected to the gearbox 100. To avoid or minimize the damage in the event that the oil system malfunctions during any operational phase, a passive mechanism is provided to temporarily provide the lubricant/coolant fluid to the pin 152 for distribution to the rest of the gearbox 100.

In the illustrated examples, the passive mechanisms are fluid traps 170a, 170b. During operation of the gas turbine engine lubricant/coolant leaks from the pin 152 into base portions 172 of the fluid traps 170a, 170b and pool in that portion. Once sufficient lubricant/coolant has accumulated in the base portions 172 of the fluid traps 170a, 170b, the lubricant/coolant is returned to the through-hole 151 in the pin 152 via spillover. The returned lubricant/coolant is distributed throughout the gearbox 100 in the manner described above. To ensure that the lubricant/coolant spills over into the pin 152, instead of away from the pin through openings 174a, 174b, the openings 174a, 174b are radially centered relative to the axis defined by the pin 152, and the opening 174 in each of the fluid traps 170a, 170b does not extend radially beyond the diameter of the through hole 153 in the pin 152. Thus, when the base portions 172 are full of lubricant/coolant, the lubricant/coolant leaks back into the pin 152 through the through-hole 151.

Each of the fluid traps 170a, 170b are connected to the carrier 110 via a connection feature 112. The connection feature 112 provides a seal against the carrier 110 and prevents accumulated lubricant/coolant from leaking between the fluid traps 170a, 170b and the carrier 110. The sealing feature may be a rubber seal element. Alternatively, the fluid traps 170a, 170b is adhered to the carrier 110 using an adhesion technique, such as bonding or welding, which provides a fluid tight seal.

The above described arrangement allows the gearbox 100 to temporarily continue operating and providing lubricant/coolant to the internal components of the gearbox 100 while no power is being provided to the power system. The wells in the fluid trap 170 may be sized to allow continued operation for a desired operational time frame, with the appropriate size for a given operational time frame being determinable by one of skill in the art.

With continued reference to FIG. 2, FIGS. 3A-3C illustrate example configurations of the fluid traps 170a, 170b of FIG. 2. Each example fluid trap 270a, 270b, 270c is illustrated as a fore view (labeled FORE) and a sectional side view drawn along the corresponding dashed line (labeled SIDE). Each of the fluid traps 270a, 270b, 270c is divided into two portions, a lower portion 210 and an upper portion 220. Each portion 210, 220 combines with an adjacent wall of the carrier 110 to which the fluid traps 270a, 270b, 270c is attached, to form a well region 212, 222 in which excess lubricant/coolant is received and retained until loss of power during which the oil is returned to the pin 152. In practical operations, once the well region 212, 222 has filled to a spillover level, the lubricant/coolant continuously spills over into the pin 152 and is replenished by the new lubricant/coolant being injected into the pin 152.

Furthermore, as can be seen in FIGS. 3A-3C, the fluid traps 270a, 270b, 270c are not limited to any particular geometry. While the illustrated example fluid traps 270a, 270b, 270c have a semicircular face (example 3A), a rectangular face (example 3B), and a half octagonal face (example 3C), any alternate geometry operable to create the upper and lower well regions 212, 222 can be utilized. The particular shape of the faces of the fluid traps 270a, 270b, 270c determines the volume of lubricant/coolant that can be retained in the well regions 212, 222, and thus how long the gearbox 100 can continue to operate in the event of a power loss.

While the upper and lower portions 210, 220 are illustrated in FIGS. 3A-3C as distinct elements, in alternate examples the upper and lower portions 210, 220 can constitute a single element with a central opening.

In some operational states, the planetary gear 140 rotates fast enough to create what is referred to as a zero gravity effect. During a zero gravity effect, the lubricant/coolant can pool at a top portion 176 of the fluid traps 170a, 170b as well as the base portion 172. The top portion 176 is arranged similar to the base portion 172 and achieves the same effect. While the illustrated example of FIG. 2 includes fluid traps 170a, 170b on both the first axial end 154 and the second axial end 156, alternate examples can include only a single fluid trap for each of the planetary gears 140, with the single fluid trap being on either of the ends 154, 156.

While the above examples describe a gear system operable to receive and input from a shaft at a sun gear 120, and output rotation at a ring gear 130, it is understood that the reverse operation could similarly be facilitated by the gear system. In this alternate example, the ring gear 130 receives a rotational input, and the gear system provides a rotational output at the shaft connected to the sun gear. Furthermore, while the above described example utilizes a planetary gear to connect the ring gear 130 to the sun gear 120, one of skill in the art will understand that the above described passive mechanisms for temporarily providing lubricant/coolant fluid to the gearbox can be applied to any intermediate gear type system including star gear systems and other similar gear systems and is not limited to planetary gears.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fan drive gear system comprising:
at least one gear that includes an axial gear passage for receiving and conveying a fluid suitable for cooling and/or lubricating;
at least a first axial end of gear of said at least one gear includes a first fluid storage trap configured to capture the fluid entering and/or exiting the axial gear passage and configured to store the fluid therein during powered operation of the fan drive gear system, the first fluid storage trap including an opening to said axial gear passage and including a second opening axially opposite the opening to the axial gear passage along a centerline axis of the axial gear passage; and
whereby the first fluid storage trap is configured to passively supply the fluid to the axial gear passage during an interrupted power event via spillover.

2. The fan drive gear system of claim 1, further comprising:
a sun gear interfaced with the gear of said at least one gear;
a ring gear interfaced with said gear of said at least one gear; and
a carrier body supporting the gear of said at least one gear.

3. The fan drive gear system of claim 2, wherein the first fluid storage trap comprises a radially outward base portion relative to an axis defined by said carrier body and at least one radially inward base portion relative to said axis defined by said carrier body.

4. The fan drive gear system of claim 3, wherein said radially outward base portion is defined on a first axial end by a radially aligned wall segment of said carrier body relative to the axis defined by the carrier body and said radially outward base portion is defined on a second axial end by a radially aligned wall of the first fluid storage trap.

5. The fan drive gear system of claim 4, wherein said radially aligned wall of said first fluid storage trap extends further radially away from said axis defined by the carrier body than said radially aligned wall segment of said carrier body.

6. The fan drive gear system of claim 4, wherein
said at least one gear includes an axially aligned through hole having an opening at a first end and an opening at a second end opposite the first end; and
said radially aligned wall segment of said carrier body extends to an edge of said opening such that excess fluid in said first fluid storage trap spills from said first fluid storage trap into said gear of the at least one gear.

7. The fan drive gear system of claim 2, wherein said first fluid storage trap comprises a first fluid storage trap disposed on a first axial end of the gear of said at least one gear and a second fluid storage trap disposed at a second end of said gear of said at least one gear.

8. The fan drive gear system of claim 2, wherein each fluid storage trap of said at least one fluid storage trap is a passive element.

9. The fan drive gear system of claim 2, wherein each fluid storage trap of the at least one fluid storage trap is affixed to said carrier body via at least one of a seal element and a bond such that a lubricant does not leak between said fluid storage trap and said carrier body.

10. The fan drive gear system of claim 9, wherein each fluid storage trap of said at least one fluid storage trap is affixed to said carrier body via at least the bond, and wherein the bond is at least one of a welded bond and an adhesive bond.

11. The fan drive gear system of claim 2, wherein said gear of said at least one gear further comprises
an axially aligned bore receiving a pin;
at least one roller bearing disposed between a radially outer surface of said pin and a radially outer surface of said gear of said at least one gear;
wherein the pin includes an axially aligned bore defining a radially inner pin surface, and the pin includes at least one through hole connecting the radially inner pin surface to a radially outer pin surface such that fluid in said through hole is passed to an interior of said carrier body.

12. The fan drive gear system of claim 4, further comprising a powered fluid injection system disposed adjacent at least one opening of said axially aligned bore such that the fluid is injected into an interior of said pin, wherein the powered fluid injection system is distinct from the first fluid trap.

13. The fan drive gear system of claim 1, wherein the first fluid storage trap is configured to capture the fluid exiting the axial gear passage.

14. The fan drive gear system of claim 1, wherein the second opening is radially centered relative to the axis defined by the gear, and the second opening does not extend radially beyond the diameter of the axial gear passage.

15. A gas turbine engine comprising
a fan;
a compressor module downstream of the fan;
a combustor downstream of the compressor;
a turbine module downstream of the combustor having at least a fan drive turbine that indirectly drives the fan;
a fan drive gear system mechanically connecting the fan drive turbine and the fan; and
wherein the fan drive gear system comprises:
at least one gear that includes an axial gear passage configured to receive and conveying a fluid suitable for cooling and/or lubricating; and
at least a first axial end of said gear of said at least one gear includes a first fluid storage trap configured to capture the fluid entering and/or exiting the axial gear passage and store the fluid therein during powered operation of the fan drive gear system, the first fluid trap including an opening to said axial gear passage and including a second opening axially opposite the opening to the axial gear passage along a centerline axis of the axial gear passage;
whereby the first fluid trap is configured to passively supply the fluid to the gear passage during an interrupted power event.

16. The gas turbine engine of claim 15, wherein the fan drive gear system further comprises:
a sun gear interfaced with said gear of said at least one gear;
a ring gear interfaced with said gear of said at least one gear; and
a carrier body supporting the gear of said at least one gear.

17. The gas turbine engine of claim 16, wherein the first fluid storage trap is operable to retain the fluid injected into said at least one gear, and return said fluid to said gear of said at least one gear.

18. The gas turbine- of claim 12, wherein said first fluid trap is disposed on a first axial end of said planetary gear and further comprising a second fluid trap disposed at a second axial end of said planetary gear, the second axial end being axially opposite the first axial end.

19. The gas turbine engine of claim 16, wherein said first fluid storage trap is a passive element.

20. The gas turbine engine of claim 16, wherein the first fluid storage trap is affixed to said carrier body via at least one of a seal element and a bond such that the fluid does not leak between said first fluid storage trap and said carrier body.

21. The fan drive gear system of claim 20, wherein said first fluid storage trap is affixed to said carrier body via at least the bond, and wherein said bond is at least one of a welded bond and an adhesive bond.

22. A method for providing fluid to a fan drive gear system during interrupted power comprising:
disposing a first fluid storage trap adjacent an opening in a gear, wherein the gear includes at least a first axial end having a first fluid storage trap configured to capture the fluid entering and/or exiting an axial gear passage and configured to store the fluid therein during powered operation of the fan drive gear system, the first fluid storage trap including an opening to said axial gear passage and including a second opening axially opposite the opening to the axial gear passage along a centerline axis of the axial gear passage;
receiving and retaining excess fluid in said fluid storage trap during powered operation of the fan drive gear system; and
passively returning said excess fluid to said fluid storage trap during unpowered operation of the fan drive gear system.

23. The method of claim 22, wherein receiving and retaining excess fluid comprises receiving said excess fluid exiting the gear and storing the excess fluid in the fluid storage trap.

* * * * *